Dec. 24, 1946.  S. C. CORONITI  2,413,218
PHOTOGRAPHIC APPARATUS
Filed July 28, 1943  2 Sheets-Sheet 1

INVENTOR.
Samuel C. Coroniti,
BY
Henry W. Coughlin
ATTORNEY

Dec. 24, 1946.   S. C. CORONITI   2,413,218
PHOTOGRAPHIC APPARATUS
Filed July 28, 1943   2 Sheets-Sheet 2

INVENTOR.
Samuel C. Coroniti,
BY
Henry W. Coughlin
ATTORNEY

Patented Dec. 24, 1946

2,413,218

UNITED STATES PATENT OFFICE 2,413,218

PHOTOGRAPHIC APPARATUS

Samuel C. Coroniti, Cambridge, Mass., assignor to General Aniline & Film Corporation, New York, N. Y., a corporation of Delaware Application July 28, 1943, Serial No. 496,383

16 Claims. (Cl. 95—75)

1

This invention relates to photographic apparatus, and more particularly to electronic means for controlling the exposure of a film as a function of the optical density of the film.

In a continuous process for treating motion picture film, the latent image, produced on a film exposed in a camera, is developed into a silver image, producing a negative transparency. In a continuous process for finishing motion picture film, the latent image produced by exposure of the film in a camera, is first subjected to development such as would normally produce a negative transparency. Without fixing that image, the film is bleached, that is, is so treated as to remove the metallic silver formed by the first development. It is then reexposed, thereby rendering the remaining silver bromide developable. That positive latent image is developed, fixed and washed. Thus, by so-called reversal development, a positive image is formed on the original film.

It is among the objects of this invention to provide an improved photographic apparatus for the continuous treatment of motion picture film; to provide photographic apparatus for controlling a second exposure of a motion picture film as a function of the optical density of the film after its first development; to provide apparatus for controlling the second exposure of a motion picture film including an element for measuring the optical density of the film and electronic means operatively associated with the element for varying the intensity of such second exposure as a function of the optical density of the film; to provide photographic apparatus including an element for measuring the optical density of film passed thereover, electronic means controlled by the element for varying the intensity of the second exposure of the film and means for delaying the effect of the measuring element on the electronic means for a period of time sufficient to permit the film to travel from the measuring element to the point where it receives its second exposure; and to provide an improved electronic control circuit.

These and other objects, advantages and features of the invention will be apparent from the following description and accompanying drawings. In the drawings.

2

Figure 3:
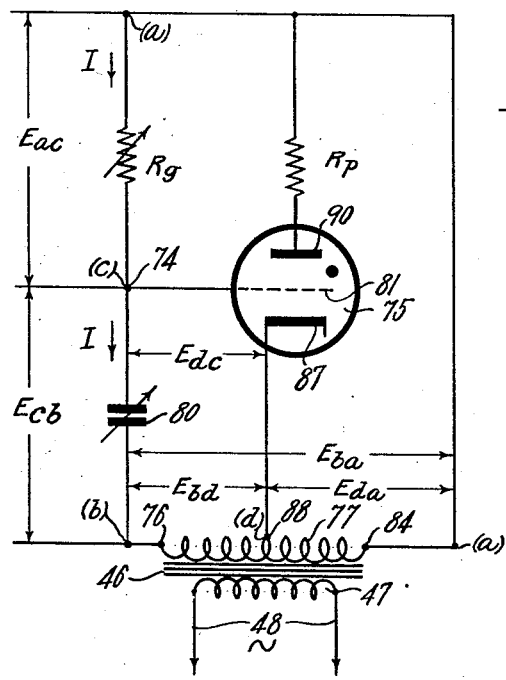

Fig. 3 is a simplified electrical diagram of the fundamental components of the control circuit.

Figure 4:
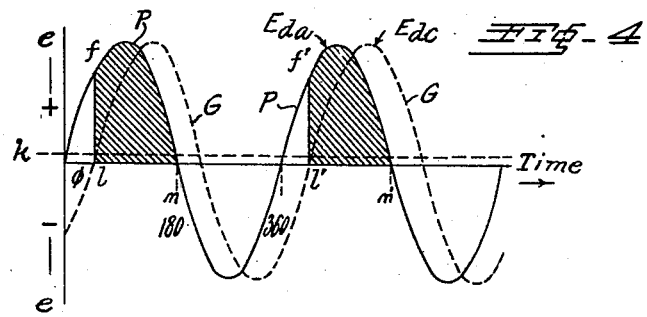

Fig. 4 is a set of curves illustrating voltage relations of the circuit of Fig. 3.

Figure 5:
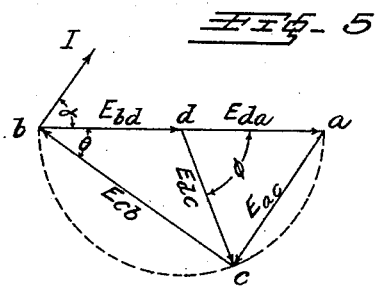

Fig. 5 is a vector diagram of the current and voltages of the circuit of Fig. 3.

Generally speaking, in the present invention a film which has been exposed in a camera and then developed, and bleached, is moved longitudinally past an element effective to measure the optical density of the film. After passing this element, the film is moved past a variable intensity light source. The optical density measuring element, through electronic means, controls the intensity of the variable intensity light source. A constant intensity light source may be provided to give a predetermined basic exposure to the film which is additive to the exposure given by the variable intensity light source. The provision of the constant intensity light source is not a necessary feature of the present invention. Such constant intensity light may be provided by arranging the variable intensity light source to have a minimum or basic intensity at all times, or may be provided by a separate light source. Means are provided for delaying the effect of the measuring element on the variable intensity light source for a sufficient period of time to permit the film to travel from a point adjacent the measuring element to a point adjacent the variable intensity light source. The light measuring element controls the intensity of the film exposure through a novel electronic control circuit.

Figure 1:
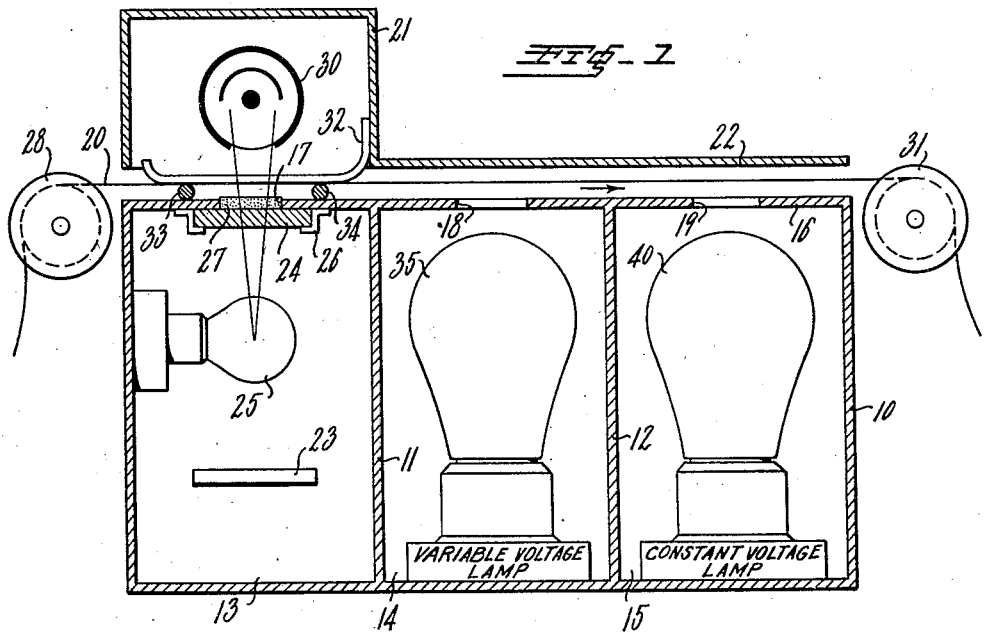
Fig. 1 is a vertical sectional view through one form of apparatus embodying the principles of the invention.

Referring to Fig. 1 of the drawings, the photographic apparatus includes a light proof housing 10 subdivided by partitions 11 and 12 into compartments 13, 14 and 15. An intermediate wall 16 of the housing 10 is formed with three apertures 17, 18 and 19, each disposed centrally of one of the compartments 13, 14 and 15. Housing 10 is formed with an extension 21 opposite the compartment 13 and with an outer wall 22 spaced from the wall 16. Walls 16 and 22 form a tunnel through which passes the film 20 which is to be given a second exposure.

A relatively small constant voltage lamp 25 is mounted in housing 13. The light from lamp 25 is directed by a mirror 23 through aperture 17 upon a photoelectric cell 30 mounted in extension 21. The particular photoelectric cell illustrated is responsive to far red and infrared rays, and has a substantially linear response to such rays. A red light filter 24 is mounted in brackets 26 adjacent aperture 17 and a matte base 27 is inserted in aperture 17. A variable voltage lamp 35 is mounted in compartment 14 and is adapted to give a variable intensity exposure to film 20 through aperture 18. If desired a constant voltage lamp 40 may be mounted in compartment 15 to give a constant intensity exposure to film 20 through aperture 19. The control of these lamps will be described more fully hereinafter.

The film 20 travels in the direction of the arrow shown in Fig. 1. The film first passes over a roller 28 and then between walls 16 and 22. At the opposite end of the housing, film 20 is threaded over a second roller 31. The film is maintained in constant spaced relation with respect to light 25 and photoelectric cell 30 by means of a guide bracket 32 which presses the film against spaced rollers 33, 34 as the film passes aperture 17.

Figure 2:
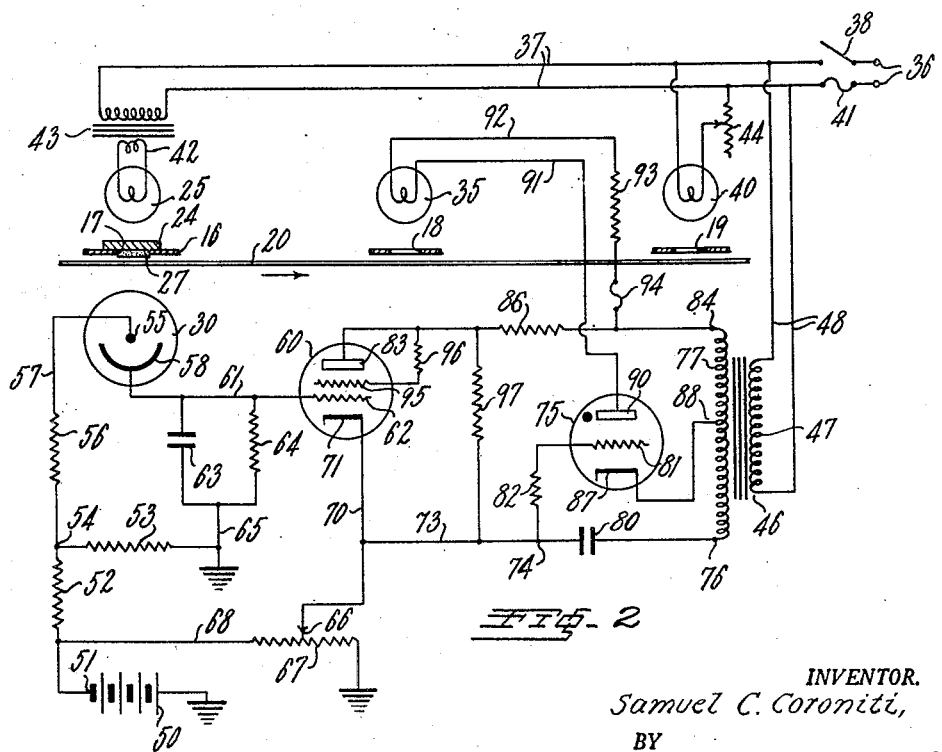
Fig. 2 is a diagrammatic representation of the apparatus shown in Fig. 1, and a control circuit associated therewith.

The operation of the apparatus and the control mechanism thereof, will be more apparent from a consideration of Fig. 2. In this figure, the elements shown in Fig. 1 have been given the same reference characters. Before passing through the apparatus of the invention, film 20 will have been processed to a permanent or to a bleached image before reaching the roll 28. It then passes in front of aperture 17 at which point light rays from lamp 25 pass through filter 24 and base 27 on to photoelectric cell 30. Through the control circuit shown in Fig. 2, the operation of which will be described more fully, photoelectric cell 30 controls the intensity of illumination of variable intensity lamp 35. Thus, as film 20 passes aperture 18, it receives an exposure from lamp 35 which is a function of the optical density of the film as measured by photoelectric cell 30. Generally, the intensity of the second exposure given by lamp 35 should be an inverse logarithmic function of the optical density of the film as measured by photoelectric cell 30 for reasons apparent to those skilled in the art. The control circuit includes means for delaying the response of lamp 35 to the measurements of photoelectric cell 30 for a period of time sufficient for a given point on the film to move from aperture 17 to aperture 18.

After passing aperture 18, film 20 may be given a constant predetermined basic exposure at aperture 19 from constant intensity lamp 40, if desired. However, the lamp 40 is not necessary to the practice of the present invention. The film then passes over roller 31, after which it is again developed, fixed and washed to form a positive image on the film. Subsequent to such treatment, the film may be examined in any well known manner and is then ready for use in a projector.

Lamps 25, 35 and 40 are energized from a suitable source of alternating current 36 which is connected to conductors 37 through a switch 38 and a fuse 41. Lamp 25 is operated at a lesser voltage than lamps 35 and 40. It is therefore connected to the secondary winding 42 of a step-down transformer 43 connected to conductors 37. The energization of variable intensity lamp 35 is controlled by the electronic control circuit as will be presently described. Constant intensity lamp 40 is connected across conductors 37 and has a variable resistor 44 in series therewith, so that the predetermined basic intensity of lamp 40 may be selected to give a desired basic exposure to film 20.

Alternating current energy for the control circuit is derived from a transformer 46 having a primary winding 47 connected by conductors 48 to conductors 37. A substantially constant direct current potential for the control circuit is supplied by any suitable source of direct current. While a battery 50 has been indicated, it will be understood that the direct current energy may be obtained from alternating current source 36 through a suitable rectifier, with the use of filters and a voltage regulator. Positive terminal 51 of direct current source 50 is connected in series with a voltage divider comprising fixed resistances 52 and 53. From the junction 54 of these resistances, a voltage is applied to anode 55 of photoelectric cell 30 through a resistor 56, and a conductor 57.

Cathode 58 of photoelectric cell 30 is connected by conductor 61 to control grid 62 of a thermionic amplifier tube 60. For a purpose to be described, a condenser 63 and a resistance 64 are connected to conductor 61 in parallel with each other. The opposite ends of condenser 63 and resistor 64 are connected by a conductor 65 to ground. A suitable bias voltage for grid 62 of tube 60 is derived from the adjustable terminal 66 of resistor or potentiometer 67, connected by a conductor 68 to positive terminal 51 of direct current source 50, through conductor 70.

The anode-cathode circuit of the amplifier tube 60 is connected to the grid circuit of a grid controlled gaseous space discharge tube 75, such as a thyratron tube. In a manner to be described, amplifier tube 60 is effective in varying the phase relation of the voltages applied to the grid and plate, respectively, of discharge tube 75. A conductor 73 connects cathode 71 of tube 60 to a junction point 74. One terminal 76 of the secondary winding 77 of transformer 46 is connected to junction point 74 through a fixed condenser 80. Grid electrode 81 of tube 75 is connected to junction point 74 through a grid current limiting resistor 82. The anode or plate 83 of thermionic amplifier 60 is connected to the opposite terminal 84 of secondary winding 77 through a current limiting resistance 86.

The cathode 87 of thyratron tube 75 is connected to the mid point 88 of secondary winding 77. Plate 90 of tube 75 is connected by a conductor 91 to one terminal of lamp 35. The opposite terminal of lamp 35 is connected through conductor 92, fixed resistance 93 and fuse 94 to terminal 84 of secondary winding 77. For a purpose to be described, the screen grid electrode 95 of amplifier tube 60 is connected through a limiting resistor 96 to plate 83, and a fixed resistor 97 is connected across the output of amplifier 60.

The operation of the circuit illustrated in Fig. 2 is effective to vary the illumination of lamp 35 in accordance with the amount of light falling on photoelectric cell 30 from lamp 25 as film 20 passes aperture 17. It will be noted that the voltage applied to grid electrode 81 of discharge tube 75 is derived from junction point 74. Junction point 74 is the connecting point between amplifier tube 60 and condenser 80, which are thus connected in series with the secondary winding 77 of transformer 46. The internal resistance of amplifier tube 60 is dependent upon the voltage applied to its grid electrode 62. Thus, with condenser 80 being relatively fixed, variations in the voltage applied to grid 62 will vary the internal resistance of amplifier tube 60. This, in turn, will vary the phase of the voltage applied to grid 81 with respect to the voltage applied to plate 90 of thyratron 75. The plate voltage is derived from the same alternating current reference source as is the grid voltage.

The voltage across secondary winding 77 is the vector sum of the voltages across amplifier tube 60 and condenser 80. The input alternating voltage between the grid and the cathode of thyratron 75 is constant in magnitude as will be made apparent hereinafter. However, the phase relation of the grid to cathode voltage with respect to the output voltage of tube 75 is controlled by the condenser 80 and amplifier tube 60. By varying the output of amplifier 60, the phase relation of the input or grid voltage of discharge tube 75 with respect to the output or plate voltage thereof is changed. The thyratron 75 is thus made to fire at a point during each cycle of applied plate voltage when the instantaneous value of such input or grid voltage exceeds the critical firing value. The firing of tube 75 is thus made dependent on the phase relation between its applied grid cathode, or input voltage, and its applied plate to cathode, or output voltage.

The internal resistance of tube 60 is a function of the amount of light reaching photoelectric cell 30. As the amount of light falling on cell 30 increases, for instance, the current flow through grid resistor 56 increases. This increases the voltage drop across resistor 56, and thus varies the voltage applied to grid electrode 62 of amplifier tube 60. The internal resistance of tube 60 is thus made dependent on the amount of light reaching photoelectric cell 30. As mentioned above, the output of tube 60, or correspondingly its effective resistance as applied to the input circuit of tube 75, varies the relative phase relation between the input and output voltages of thyratron tube 75. This in turn determines during what portion of each cycle of applied plate voltage tube 75 will be conductive. As lamp 35 is in series with the output of tube 75, its average intensity of illumination is accordingly controlled as a function of the effective resistance of amplifier tube 60. This action is described in detail hereinafter with reference to Figs. 3, 4 and 5.

By selection of an amplifier tube 60 with suitable characteristics, and by design of the parameters of the circuits of tube 60, the response of lamp 35 to the control exerted by photoelectric cell 30 may be made to bear any desired relation. As stated above, in the present instance, the intensity of illumination of lamp 35 is designed to vary inversely, and as a logarithmic function of the optical density of film 20.

The variation of the parameters of the circuits of amplifier 60 may be accomplished in any desired manner. In one practical embodiment of the invention, a pentode of the type "6F6" has been used satisfactorily as amplifier tube 60. The design of the parameters of the circuits of tube 60 is improved by the use of the screen grid resistor 96 and shunt resistor 97 connected across the output of tube 60. In the described embodiment, with the use of a red light filter 24, a red light responsive photoelectric cell 30 having a linear response, and a pentode for amplifier 60, the circuit parameters necessary to produce proper control of lamp 35 are effectively obtained in practice.

One other criterion is taken into consideration in the operation of the illustrated apparatus. It takes a small interval of time for a given point on film 20 to move from aperture 17 to adjacent aperture 18. The imposition of the control signal from photoelectric cell 30 on the control circuit is delayed for this interval. This is accomplished by a time delay circuit including condenser 63 and resistance 64 which are connected in parallel with the control grid 62 of amplifier tube 60 and photoelectric cell 30. By proper selection of the relative sizes of condenser 63 and resistance 64, the proper time delay in the impression of the control signal from photoelectric cell 30 on the control grid 62 of tube 60 is obtained.

Figs. 3, 4 and 5 diagrammatically illustrate the general principles underlying the electronic control action of the present invention. The control circuit in a simplified form is illustrated in Fig. 3. For reference, the points of differing potential, such as the terminals of winding 77 of transformer 46, junction point 74 and mid-point 88 of winding 77 have been also designated with the letters $a$, $b$, $c$ and $d$, respectively. Variable intensity lamp 35 is represented by resistance $R_p$ and the output effect of amplifier 60 by variable resistance $R_g$. Also, the potential differences between the respective points have been designated $E_{da}$, $E_{bd}$, $E_{dc}$ and $E_{ac}$.

In Fig. 4 are curves illustrating the operation of the circuit through two cycles. The grid voltage $E_{dc}$ is represented by the broken line curve G. The output voltage of tube 75 is represented by the solid line curve P. In the instant illustration, the grid voltage G lags the plate or output voltage P by $\phi$ electrical degrees. The grid voltage G must obtain a certain critical value $k$ before tube 75 can become conductive or fire. As shown in Fig. 4, the plate voltage obtained the positive potential $lf$ at the time the grid attains its critical potential $k$ and tube 75 starts to fire. Tube 75 continues to fire for the rest of the positive half cycle, to point $m$. Tube 75 remains non-conducting until its plate voltage P reaches the value $l'f'$, when the grid voltage G again reaches the magnitude $k$. The tube 75 will again become conductive and remain conductive for the remaining half cycle to point $m'$.

The conducting time $ln$ of tube 75 may be made smaller or larger by varying the electrical phase displacement $\phi$ of the grid voltage G with respect to the plate voltage P. In Fig. 4, this would be represented by shifting curve G to the right or the left with respect to curve P. The maximum time for conduction of tube 75 is practically for a complete half cycle or about 180°. Thus, by varying the phase difference between the plate and grid voltages of tube 75, the amount of time during which tube 75 is conductive is correspondingly varied.

Fig. 5 is a vector diagram of the relation of phase angle $\phi$ and the grid and plate voltages $E_{dc}$ and $E_{da}$. The current I flowing through the resistance $R_g$ and condenser 80 here leads the voltage $E_{ba}$ across transformer winding 77 by an angle $\alpha$. The voltage drop $E_{ac}$ across resistance $R_g$ is in phase with current I. The voltage $E_{cb}$ across condenser 80 lags 90° with respect to current I. The vector sum of the voltages $E_{ac}$ and $E_{cb}$ is equal to the total voltage $E_{ba}$ of the secondary 77 of transformer 46. This relation holds for all conditions. The vectors $E_{cb}$ and $E_{ac}$ make a right angle with each other for all values of the angle $\alpha$. Hence the locus of point $c$ for all values of $\alpha$ from zero to 90° will be a semi-circle with fixed vector $E_{ba}$ as diameter.

The voltage between grid 81 and the cathode 87 of tube 75 is represented by the vector $E_{dc}$ which is a radius of such circle. Since the voltages $E_{bd}$ and $E_{da}$ are one-half of $E_{ba}$, the magnitude of vector $E_{dc}$ is equal to that of $E_{bd}$ and $E_{da}$. Vector $E_{dc}$ is thus constant in magnitude for all such values of $\alpha$. Movement of vector $E_{dc}$ in either a clockwise or a counterclockwise direction will vary the relative magnitudes of the vectors $E_{bc}$ and $E_{ca}$, and likewise, the phase angle $\phi$ between the plate voltage $E_{da}$ and grid voltage $E_{dc}$. It will be apparent that either the voltage across the condenser 80 or that across the resistance $R_g$ can be varied from zero to the respective full values of the transformer secondary voltage $E_{ba}$; and the phase angle $\phi$ thus varied from 0° to 180°.

Referring again to Fig. 3, either resistance $R_g$ may be held constant and condenser 80 varied, or vice versa, to vary the phase relation $\phi$ of the grid or input voltage of tube 75 with respect to the plate or output voltage thereof. As pointed out in connection with Fig. 4, this correspondingly varies the time interval during which tube 75 is conductive. In practice, either resistance $R_g$ or condenser 80, or both, may be varied manually, mechanically, electronically or automatically. In the illustrated embodiment condenser 80 is held constant, and resistance $R_g$ is electronically varied by amplifier tube 60. In turn, tube 60 is herein automatically controlled by photoelectric cell 30.

Variations in the conductivity or internal resistance of amplifier tube 60 as controlled by the amount of light reaching photoelectric cell 30, will vary the phase relationship $\phi$ of the voltage applied to grid 81 of tube 75 with respect to the voltage applied to plate 90 thereof.

The control circuit including the time delay circuit comprising condenser 63 and resistance 64, amplifier tube 60, discharge tube 75, condenser 80, and the load comprising lamp 35, is of general application. That is, it may be used otherwise than in the specific case illustrated in the drawings. Likewise, the control of photoelectric cell 30 on variable intensity lamp 35 can be exercised through a control circuit different from that illustrated, through the use of suitable equivalent electronic means.

It should therefore be understood that while a specific embodiment of the invention has been shown and described, to illustrate how the principles of the invention may be applied, the invention is not limited thereto, but may be otherwise embodied without departing from the principles thereof.

I claim:

1. Apparatus for use in a photographic process comprising a photoelectric cell; a variable intensity light source spaced from said photoelectric cell; means for directing an image bearing photographic film, which has been exposed, partially developed, and bleached, successively past said photoelectric cell and said variable intensity light source; a light system for directing a beam of light through said film upon said photoelectric cell; a grid-controlled discharge device controlling the energization of said variable intensity light source; a reference source of alternating current; circuit means for applying a voltage from said source to the plate of said device; means, including a capacitance and grid-controlled electronic means in parallel circuit relation with said capacitance, for applying a voltage from said source to the grid of said device; and circuit means connecting the control grid of said electronic means to said photoelectric cell.

2. Apparatus for use in a photographic process comprising a photoelectric cell; a variable intensity light source spaced from said photoelectric cell; means for directing an image bearing photographic film, which has been exposed, partially developed, and bleached, successively past said photoelectric cell and said variable intensity light source; a light system for directing a beam of light through said film upon said photoelectric cell; a grid-controlled discharge device controlling the energization of said variable intensity light source; a reference source of alternating current; circuit means for applying a voltage from said source to the plate of said device; means, including a capacitance and grid-controlled electronic means in parallel circuit relation with said capacitance, for applying a voltage from said source to the grid of said device; circuit means connecting the control grid of said electronic means to said photoelectric cell; and means for delaying the action of said photoelectric cell on said electronic means in accordance with the spacing between said photoelectric cell and said light source.

3. Apparatus for use in a photographic process comprising a photoelectric cell; a variable intensity light source spaced from said photoelectric cell; means for directing an image bearing photographic film, which has been exposed, partially developed, and bleached, successively past said photoelectric cell and said variable intensity light source; a light system for directing a beam of light through said film upon said photoelectric cell; a grid-controlled discharge device controlling the energization of said variable intensity light source; a reference source of alternating current; circuit means for applying a voltage from said source to the plate of said device; means, including a capacitance and grid-controlled electronic means in parallel circuit relation with said capacitance, for applying a voltage from said source to the grid of said device; circuit means connecting the control grid of said electronic means to said photoelectric cell; and means, including a resistance and a capacitance connected in parallel circuit relation with each other and with said photoelectric cell and the grid of said electronic means, for delaying the action of said photoelectric cell on said electronic means for the time interval necessary for a reference point on said film to travel from a point opposite said photoelectric cell to a point opposite said variable intensity light source.

4. In a device for photographic printing, means for scanning a film including a light source and a photo-responsive element, a variable source of radiation for effecting an exposure and means for progressing film past the said scanning means and source of radiation, and means for varying the intensity of the source of radiation as a function of the amount of light falling on the photo-responsive element which includes in circuit with said element, a discharge tube the output of which is in series with said variable source of radiation, a current supply for said tube, a capacitance in series with the voltage input of said discharge tube, and an electronically variable resistor effective for changing the phase angle between the input and output voltages of said discharge tube.

5. In a device for photographic printing, means for scanning a film including a light source and a photo-responsive element, a variable source of radiation for effecting an exposure and means for progressing film past the said scanning means and source of radiation, and means for varying the intensity of the source of radiation as a function of the amount of light falling on the photo-responsive element which includes in circuit with said element, a discharge tube the output of which is in series with said variable source of radiation, a current supply for said tube, a capacitance in series with the voltage input of said discharge tube, and a resistor comprising a thermionic amplifier effective for changing the phase angle between the input and output voltages of said discharge tube.

6. In a device for photographic printing, means for scanning a film including a light source and a photo-responsive element, a variable source of radiation for effecting an exposure and means for progressing film past the said scanning means and source of radiation, and means for varying the intensity of the source of radiation as a function of the amount of light falling on the photo-responsive element which includes in circuit with said element, a discharge tube the output of which is in series with said variable source of radiation, a current supply for said tube, a capacitance in series with the voltage input of said discharge tube, and a resistor comprising a thermionic amplifier effective for changing the phase angle between the input and output voltages of said discharge tube, said thermionic amplifier having a control grid, said grid having its potential varied in accordance with changes in current flowing from the cathode of said photo-responsive element.

7. In a device for photographic printing, means for scanning a film including a light source and a photo-responsive element, a variable source of radiation for effecting an exposure and means for progressing film past the said scanning means and source of radiation, and means for varying the intensity of the source of radiation as a function of the amount of light falling on the photo-responsive element which includes in circuit with said element, a discharge tube the output of which is in series with said variable source of radiation, a current supply for said tube, a control grid therefor, and a thermionic amplifier connected to the cathode of the photo-responsive element and by which the phase relationship between the output voltage of said discharge tube and the grid voltage supplied thereto may be varied.

8. In a device for photographic printing, means for scanning a film including a light source and a photo-responsive element, a variable source of radiation for effecting an exposure and means for progressing film past the said scanning means and source of radiation, and means for varying the intensity of the source of radiation as a function of the amount of light falling on the photo-responsive element which includes in circuit with said element, a discharge tube, a current supply for said tube, and a thermionic amplifier connected to the cathode of the photo-responsive element and by which the output of said tube is varied, and other means forming a part of said circuit for delaying the effect of changes in output current from the photo-responsive element upon the output of the discharge tube so that said changes shall become effective only after a reference point on the film has moved from the scanning point to the variable source of radiation.

9. In a device for photographic printing, means for scanning a film including a light source and a photo-responsive element, a variable source of radiation for effecting an exposure and means for progressing film past the said scanning means and source of radiation, and means for varying the intensity of the source of radiation as a function of the amount of light falling on the photo-responsive element which includes in circuit with said element, a discharge tube, a current supply for said tube, means for varying the output of said tube including a capacitance and a thermionic amplifier, and other means forming a part of said circuit and including a capacitance and a resistance in parallel with said circuit by which the effect of changes in output current from said photo-responsive element upon said thermionic amplifier and on the output of said discharge tube is delayed so that said changes shall become effective only after a reference point on the film has moved from the scanning point to the variable source of radiation.

10. In a device for photographic printing, means for scanning a film including a light source and a photo-responsive element, a variable source of radiation for effecting an exposure and means for progressing film past the said scanning means and source of radiation, and means for varying the intensity of the source of radiation as a function of the amount of light falling on the photo-responsive element which includes in circuit with said element, a discharge tube having a control grid, a current supply for said tube, electronically functioning means by which the output of said tube is varied, said means including a capacitance and a thermionic amplifier tube having a control grid and plate, the output of said amplifier tube at said plate being connected with both the current supply and the variable source of radiation, the control grid of said tube being connected to the cathode of the photo-responsive element, the circuit through said variable source of radiation being completed by a connection to the anode of the discharge tube.

11. In a device for photographic printing, means for scanning a film including a light source and a photo-responsive element, a variable source of radiation for effecting an exposure and means for progressing film past the said scanning means and source of radiation, and means for varying the intensity of the source of radiation as a function of the amount of light falling on the photo-responsive element which includes in circuit with said element, a discharge tube having a control grid and an anode, a current supply for said tube, an electronically functioning means by which the output of said tube is varied and by which the effect of changes initiated at the photo-responsive element is delayed, including a capacitance between the current supply and the control grid of the discharge tube, a thermionic amplifier tube having a control grid and a plate, means connecting said control grid to the cathode of said photo-responsive element, means connecting the plate of said tube to the variable source of radiation and the current supply, said connection to the source of radiation having its circuit completed through to the anode of the discharge tube, and a capacitance and resistance connected in parallel to the circuit between the cathode of the photo-responsive element and the control grid of the thermionic tube.

12. Mechanism as defined in claim 11 further characterized by an additional and normally invariable source of radiation.

13. Mechanism as defined in claim 11 further characterized by an addition within the circuit which includes a battery, a connection therefrom through a resistance to the anode of said photo-responsive element, a voltage divider connected to a ground line from that part of the circuit formed by the capacitance and resistance in parallel and by which the effect of changes initiated at the photo-responsive element are delayed.

14. Mechanism as defined in claim 11 in which the thermionic amplifier tube has a screen grid and a connection leading therefrom through a resistance to the output of the plate of said tube.

15. Mechanism as defined in claim 11 in which current supplied to the control grid of the discharge tube is limited by a resistor.

16. Mechanism as defined in claim 11 in which a biasing voltage for the control grid of the thermionic amplifier tube is supplied through a variable resistor.

SAMUEL C. CORONITI.